(12) United States Patent
Cornelius et al.

(10) Patent No.: US 8,167,534 B2
(45) Date of Patent: May 1, 2012

(54) SEAL FOR A TURBINE ENGINE (75) Inventors: Charles C. Cornelius, Coronado, CA (US); Gabriel J. Glynn, San Diego, CA (US)

(73) Assignee: Solar Turbines Inc., San Diego, CA (US)

( * ) Notice: Subject to any disclaimer, the term of this patent is extended or adjusted under 35 U.S.C. 154(b) by 1265 days.

(21) Appl. No.: 11/898,639

(22) Filed: Sep. 13, 2007

(65) Prior Publication Data

US 2008/0066444 A1 Mar. 20, 2008

Related U.S. Application Data (60) Provisional application No. 60/844,391, filed on Sep. 14, 2006.

(51) Int. Cl.
*F01D 11/04* (2006.01)

(52) U.S. Cl. ........... 415/112; 415/168.2; 415/168.4; 415/174.5; 415/230

(58) Field of Classification Search .......... 415/111, 415/112, 168.2, 168.4, 174.5, 229, 230; 277/411, 277/412, 418, 431
See application file for complete search history.

(56) References Cited

U.S. PATENT DOCUMENTS

| | | |
|---|---|---|
| 2,165,448 A | 7/1939 | Browne |
| 3,303,994 A | 2/1967 | Morooka |
| 3,574,478 A | 4/1971 | Salzmann et al. |
| 4,402,515 A | 9/1983 | Malott |
| 4,673,332 A | 6/1987 | Smith |
| 5,160,149 A | 11/1992 | Winn |
| 5,464,227 A | 11/1995 | Olson |
| 5,575,145 A | 11/1996 | O'Neill et al. |
| 5,636,848 A | 6/1997 | Hager et al. |
| 6,000,701 A | 12/1999 | Burgess |
| 6,142,729 A | 11/2000 | Tran et al. |
| 6,325,381 B1 | 12/2001 | von Engelbrechten |
| 6,330,790 B1 | 12/2001 | Arora et al. |
| 6,619,908 B2 | 9/2003 | Bruno et al. |
| 6,976,679 B2 * | 12/2005 | Goss et al. .............. 277/347 |
| 7,025,356 B1 | 4/2006 | Cheung et al. |
| 2005/0098957 A1 | 5/2005 | Goss et al. |

FOREIGN PATENT DOCUMENTS

GB 777954 7/1957

* cited by examiner

*Primary Examiner* — Edward Look
*Assistant Examiner* — Jesse Prager
(74) *Attorney, Agent, or Firm* — Finnegan, Henderson, Farabow, Garrett & Dunner LLP (57) ABSTRACT

In one aspect, the present disclosure is directed to a turbine engine. The engine may include a main housing defining a compressor compartment and an air intake housing mounted to the main housing. The engine may also include a rotor including a compressor portion disposed within the compressor compartment, and a hub portion extending from the compressor compartment through an opening in the air intake housing into a bearing compartment defined by the air intake housing. The engine may further include a seal mounted in the opening in the air intake housing in an annular gap between the hub portion of the rotor and the air intake housing and configured to form a seal between the bearing compartment and the compressor compartment. The seal may be configured to be removed from the opening in the air intake housing while the air intake housing is mounted to the main housing.

11 Claims, 6 Drawing Sheets

SEAL FOR A TURBINE ENGINE

PRIORITY

The present application claims the benefit of priority under 35 U.S.C. §119(e) to U.S. provisional patent application No. 60/844,391, filed Sep. 14, 2006.

TECHNICAL FIELD

The present disclosure is directed to a seal for a turbine engine and, more particularly, to an air/oil seal configured to be removed from the engine without extensive disassembly of the engine.

BACKGROUND

Gas turbine engines may be used in industrial applications, such as, but not limited to, oil and natural gas transmission, gathering, storage, withdrawal, and lifting. In these applications, turbine engines are often located in offshore or remote locations, and it is very costly for customers to ship the engines off-site to the manufacturer for maintenance and/or repairs. Particularly, customers incur expenses in terms of shipment and maintenance or repair costs, as well as production down-time. Accordingly, it would be advantageous to enable on-site repairs and maintenance by the turbine engine manufacturers, especially in remote or off-shore customer locations.

The conventional construction of turbine engines, however, does not facilitate on-site maintenance or repairs, particularly because components of the engine most susceptible to wear—and therefore, failure—are embedded within the casing of the engine. Therefore, these components cannot be accessed without disassembling at least a significant portion of the engine, which is usually not feasible on a customer site for a variety of reasons. For example, an offshore oil platform may have space constraints that are not conducive to disassembly. Additionally, it may be difficult and/or expensive for the manufacturer to bring certain tools required for disassembling the engine to the customer site; or the space constraints imposed by the customer site may preclude bringing such tools. Additionally, turbine engines are often assembled and disassembled vertically in the factory. In the field, however, the engines are commonly arranged horizontally, which makes disassembly cumbersome. Thus, for at least these reasons, turbine engines must often be shipped off-site to the manufacturer for repairs and maintenance, which is inefficient and expensive.

Turbine engines generally comprise a plurality of rotating airfoils within a casing that drive (rotate) an axial shaft that extends longitudinally through the center of the engine. The shaft usually protrudes from the engine casing, and is used to drive subsequent components and/or systems, such as pumps, etc. Additionally, an accessory drive gearbox can be coupled to a protruding portion of the shaft via a coupling shaft.

The accessory drive gear box may have one or more gears and may be used to provide power to auxiliary systems such as generators, alternators, air conditioning systems, pneumatic systems, hydraulic systems, or the like. Also coupled to the protruding portion of the shaft may be, among other things, a bearing assembly for mounting the shaft to the engine and supporting both radial loads and axial thrust loads from the shaft; a thrust collar for transferring the axial load to the bearing assembly; and a forward air/oil seal, which seals lubricant, such as oil, within the bearing assembly and prevents the oil from infiltrating the compressor. The components of a turbine engine that can be among the most susceptible to wear and failure include the bearing assembly, the thrust collar, and the forward air/oil seal.

Various seal designs have been developed for the air/oil barrier between bearing compartments and compressor compartments. For example, U.S. Pat. No. 6,330,790 to Arora et al. (hereinafter "the '790 patent") discloses a labyrinth seal between a bearing compartment and a compressor compartment. However, extensive disassembly of this engine is required for removal of the seal. In this configuration, in order to remove the abradable (i.e., wearable) portion of the seal, the air intake housing must be removed because the seal is larger than the opening in the air intake housing and is located aft of that opening. Such extensive disassembly makes repair/replacement of the seal impractical to carry out in the field. Therefore, the engine must be transported to a repair site equipped with specialized, large-scale equipment designed to support and remove large components like the air intake housing. It is also noteworthy that, in some systems, as in the '790 patent, the forward seal is actually two separate seals. Often these separate seals have different diameters, i.e., in a stepped configuration. Designs with two separate seals can be more expensive (i.e., simply because there is an additional part) and even more difficult/costly to service (i.e., because more engine disassembly may be required to remove both seals).

In addition, some turbine engine manufacturers have developed systems in which the protruding shaft extends through, and sometimes beyond, the air inlet housing and is supported with a bearing assembly that is supported by a separate bearing housing, which may be fastened to the air intake housing. In such configurations, the bearing assembly may be accessed without removing the air intake housing from the engine. However, supporting the bearing assembly with a separate bearing housing can be a less robust design than supporting the bearing assembly with the air intake housing, which is typically a large, rugged structure. Therefore, systems with these configurations often sacrifice the robustness of the shaft support in order to produce an engine that is more easily serviced.

The present disclosure is directed toward overcoming one or more of the problems discussed above.

SUMMARY OF THE INVENTION

In one aspect, the present disclosure is directed to a turbine engine. The engine may include a main housing defining a compressor compartment and an air intake housing mounted to the main housing. The engine may also include a rotor including a compressor portion disposed within the compressor compartment, and a hub portion extending from the compressor compartment through an opening in the air intake housing into a bearing compartment defined by the air intake housing. The engine may further include a seal mounted in the opening in the air intake housing in an annular gap between the hub portion of the rotor and the air intake housing and configured to form a seal between the bearing compartment and the compressor compartment. The seal may be configured to be removed from the opening in the air intake housing while the air intake housing is mounted to the main housing.

In another aspect, the present disclosure is directed to a method of removing a seal from a turbine engine, wherein the turbine engine includes a main housing defining a compressor compartment; an air intake housing mounted to the main housing; a rotor including a hub portion extending from the compressor compartment through an opening in the air intake housing into a bearing compartment defined by the air intake housing; and a seal mounted in the opening of the air intake housing and forming a seal between the bearing compartment and the compressor compartment. The method may include removing one or more components from the hub portion of the rotor. The method may also include removing the seal from the opening in the air intake housing while the air intake housing is mounted to the main housing.

In another aspect, the present disclosure may be directed to a seal for a turbine engine. The air/oil seal may include a substantially tubular element configured to be removably mounted in an opening in an air intake housing of the turbine engine. The seal may also include a circumferential array of air inlet holes disposed about a circumference of the substantially tubular element of the seal and a circumferential array of vent holes disposed about a circumference of the substantially tubular element of the seal. The air inlet holes may be equally sized and equally spaced about the circumference of the seal and the vent holes may be equally sized but larger in diameter than the air inlet holes and may be equally spaced about the circumference of the seal.

DETAILED DESCRIPTION

Reference will now be made in detail to the drawings. Wherever possible, the same reference numbers will be used throughout the drawings to refer to the same or like parts.

Figure 1:
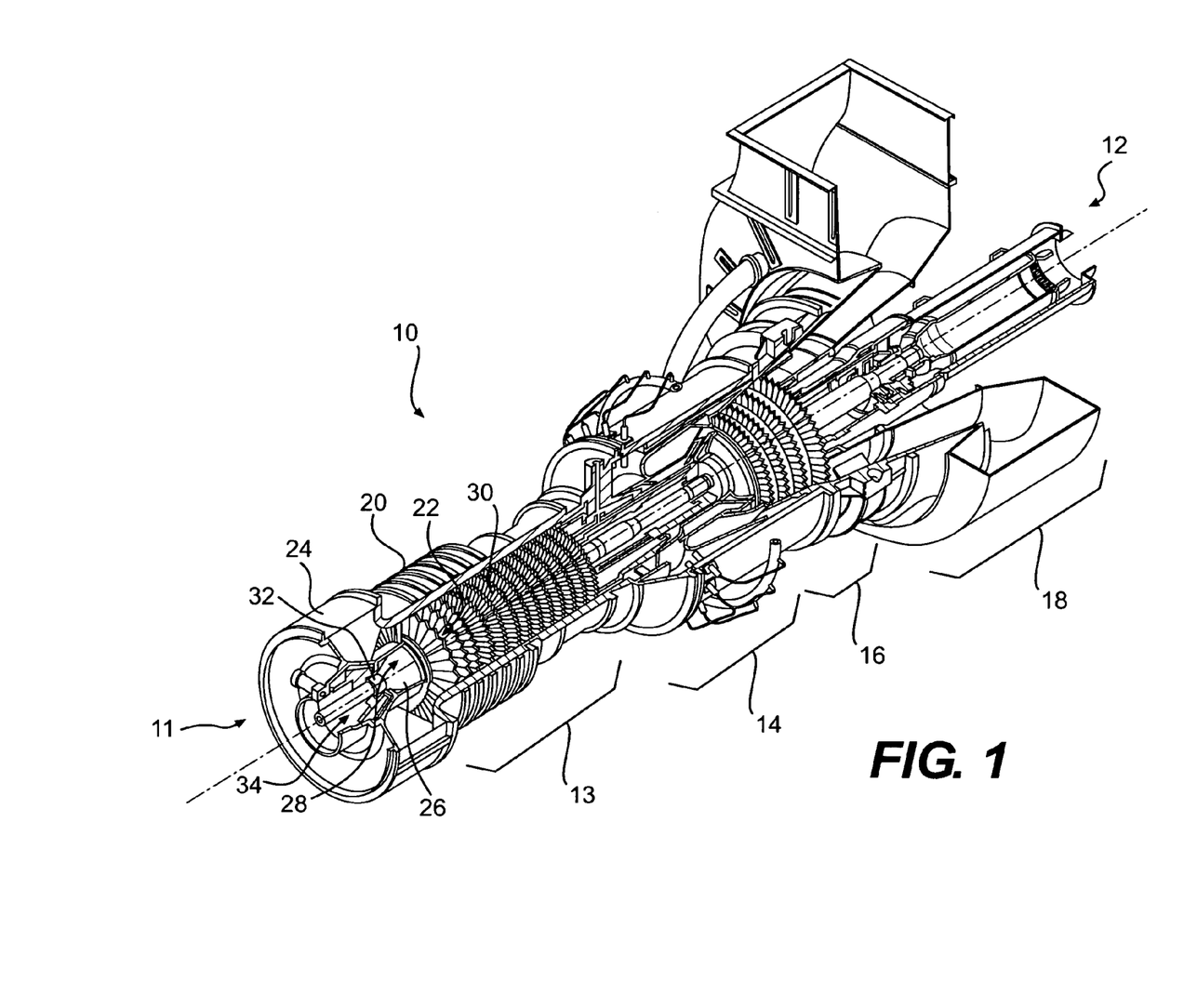
FIG. 1 is a diagrammatic illustration of a turbine engine.

FIG. 1 illustrates a turbine engine 10. FIG. 1 depicts a general turbine engine configuration. FIG. 1 is not intended to illustrate an exemplary disclosed embodiment, but rather is provided to show the general relationships between various components of an exemplary turbine engine configuration. Although FIG. 1 depicts engine components generally, the reference numbers used in FIG. 1 will also be used throughout the drawings to refer to exemplary embodiments of the components illustrated in FIG. 1.

In some embodiments, engine 10 may be a gas turbine engine. Engine 10 may be associated with a stationary or mobile machine configured to accomplish a predetermined task. For example, engine 10 may embody the primary power source of a generator set that produces an electrical power output or the primary power source of a pumping mechanism that performs a fluid pumping operation. Alternatively, turbine engine 10 may embody the prime mover of an earth-moving machine, a passenger vehicle, a marine vessel, or any other mobile machine known in the art. Engine 10 may include a forward end 11 and an aft end 12. Engine 10 may also include a compressor section 13, a combustor section 14, a turbine section 16, and an exhaust section 18.

Engine 10 may include a main housing 20 defining a compressor compartment 22 and an air intake housing 24 mounted to main housing 20 and configured to direct air into compressor compartment 22. Engine 10 may also include a rotor 26 including a compressor portion 28 disposed within compressor compartment 22. Compressor portion 28 of rotor 26 may include compressor blades 30 mounted thereon. Rotor 26 may also include a hub portion 32 extending from compressor compartment 22 through an opening in air intake housing 24 into a bearing compartment 34 defined by air intake housing 24.

Figure 2:
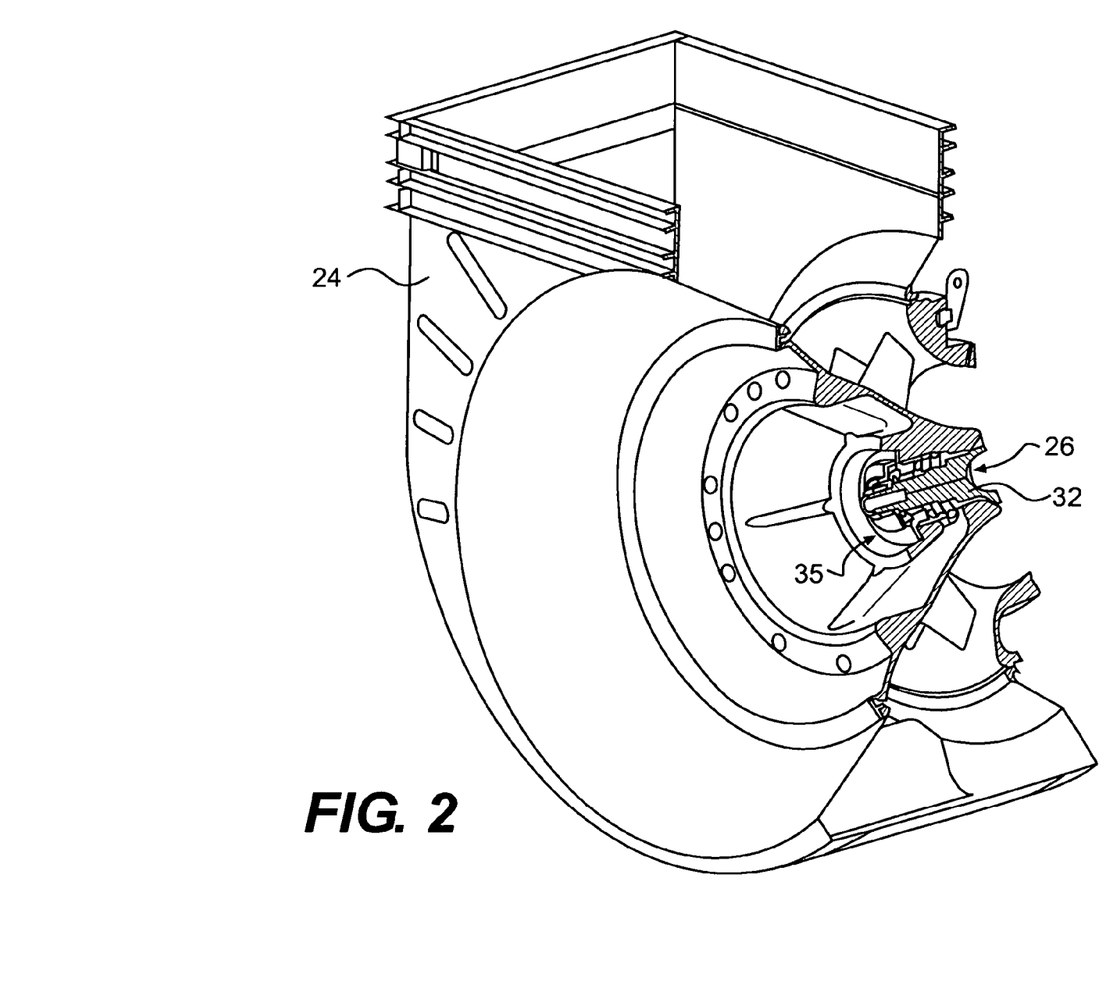
FIG. 2 is a perspective, partial cross-sectional view of an air intake housing of a turbine engine according to an exemplary disclosed embodiment.

FIG. 2 illustrates an exemplary embodiment of air intake housing 24. As illustrated in FIG. 2, a bearing assembly 35 may be configured to be supported by air intake housing 24.

Figure 3:
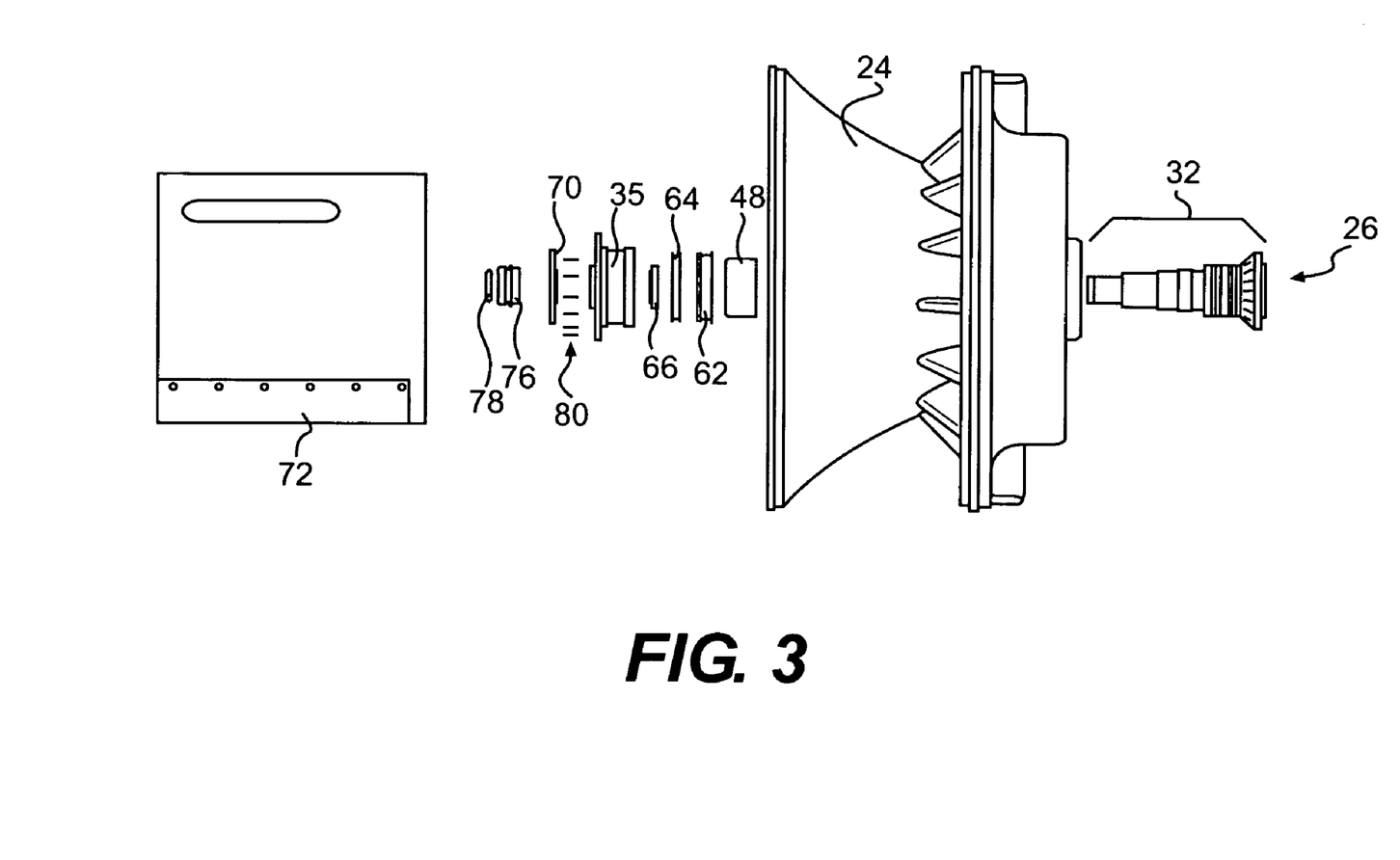
FIG. 3 is an exploded view of components of a forward end of a turbine engine according to an exemplary disclosed embodiment.
Figure 4:
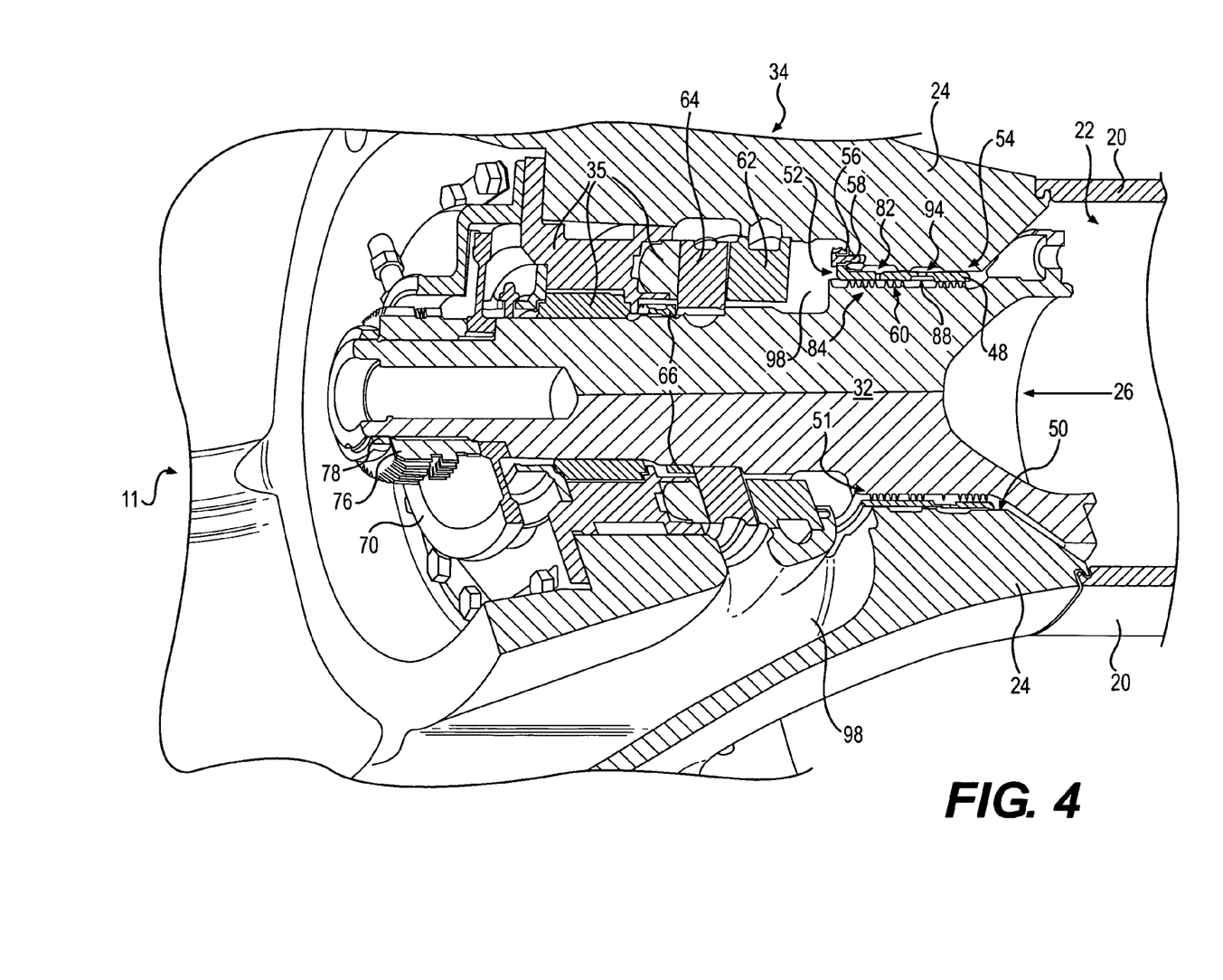
FIG. 4 is perspective, partial cross-sectional view of a turbine engine bearing compartment according to an exemplary disclosed embodiment.

As shown in FIGS. 3 and 4, engine 10 may include a seal 48, which may be removable without extensive disassembly of engine 10. Seal 48 may include a substantially tubular element configured to be removably mounted on an inner portion of an opening 50 in air intake housing 24, in an annular gap 51 (as shown in FIG. 4) between hub portion 32 of rotor 26 and air intake housing 24. Thus, seal 48 may be configured to form a seal between bearing compartment 34 and compressor compartment 22. Seal 48 may be an air/oil seal, configured to prevent oil in bearing compartment 34 from infiltrating compressor compartment 22.

The presently disclosed embodiments enable access to seal 48 without removal of air intake housing 24. That is, seal 48 may be removed and installed from an opening 50 in air intake housing 24 while air intake housing 24 is mounted to main housing 20. In addition, seal 48 may include a single, long seal including a substantially tubular element having a substantially consistent average diameter over its axial length, rather than two or more short, stepped seals having larger diameters as in some designs, such as those discussed in the Background section above.

As illustrated in FIG. 4, opening 50 may be the smallest opening between compressor compartment 22 and bearing compartment 34. Accordingly, seal 48 may be sized to fit within this smallest opening 50, and thus, may be removed from the bearing compartment side of opening 50 (i.e., from the forward end of engine 10). Seal 48 may include a forward end 52 facing bearing compartment 34, and an aft end 54 facing compressor compartment 22. In some embodiments, seal 48 may include at least one coupling flange 56 extending radially outwardly from the substantially tubular element at forward end 52 of seal 48. Coupling flange 56 may be secured to air intake housing 24 with one or more fasteners, such as bolts 58, screws, pins, etc.

Rotor 26 may also include knife-edge sealing members 60 with which seal 48 may be configured to mate, thereby forming a labyrinth seal interface 84. Knife-edge sealing members 60 may each have the same outer diameter and may be formed of a durable, hard material, such as steel. Seal 48 may be formed of a material somewhat softer than that of knife-edge sealing members 60. For example, seal 48 may include a steel backing and a softer material coating, such as bronze (a.k.a. babbitt material). The coating may also be referred to as an "abradable coating," or an "abradable material."

As illustrated in FIGS. 3 and 4, engine 10 may also include several other components within bearing compartment 34. One or more of these components may be configured to be mounted on hub portion 32 of rotor 26, such as, for example, an aft thrust bearing 62 (which may be configured to support axial loads, including loads in a reverse (i.e., aft) direction), a thrust collar 64, a thrust collar nut 66, a bearing assembly 35, a trim balance flywheel 70, and an accessory drive gearbox 72, which may be configured to drive an accessory device (not shown), such as an oil pump or air compressor. Alternatively or additionally, externally powered devices may be operatively connected to rotor 26 in order to drive rotor 26 (i.e., rather than being driven by rotor 26) under certain circumstances. For example, a starter may be configured to turn rotor 26 in order to start engine 10. A turning gear may also be configured to turn rotor 26 while rotor 26 cools down after engine shut down in order to prevent rotor 26 from bowing. Accessory drive gearbox 72 may be mounted to the forward end of hub portion 32 of rotor 26 via an accessory drive hub 76, which may be secured on rotor 26 with an accessory drive retainer nut 78.

Bearing assembly 35 may be a combination bearing, configured to support both axial loads (i.e., thrust) and radial loads between rotor 26 and air intake housing 24. Bearing assembly 35 may be mounted within a mating opening in air intake housing 24 (for example, with plate locks and bolts 80) and maintain a small clearance between itself and hub portion 32 of rotor 26, wherein an oil film maintains separation and transfers axial loads between hub portion 32 and air intake housing 24. Thrust collar 64 may be mounted on hub portion 32 of rotor 26, and configured to transfer axial loads to bearing assembly 35. In some embodiments, the substantially tubular element of seal 48 may have an average diameter substantially the same as the average diameter of bearing assembly 35.

One design feature of engine 10 that enables the utilization of the presently disclosed air/oil seal design (i.e., a single, long seal having a similar diameter to the bearing assembly) is that air intake housing 24 and rotor 26 are longer than previous versions. Because air intake housing 24 and rotor 26 are longer, hub portion 32 has a longer section having a small diameter (i.e., the forward end of the hub portion 32), thereby enabling both bearing assembly 35 and seal 48 to be mounted on the small diameter portion of hub portion 32 of rotor 26.

Figure 5:
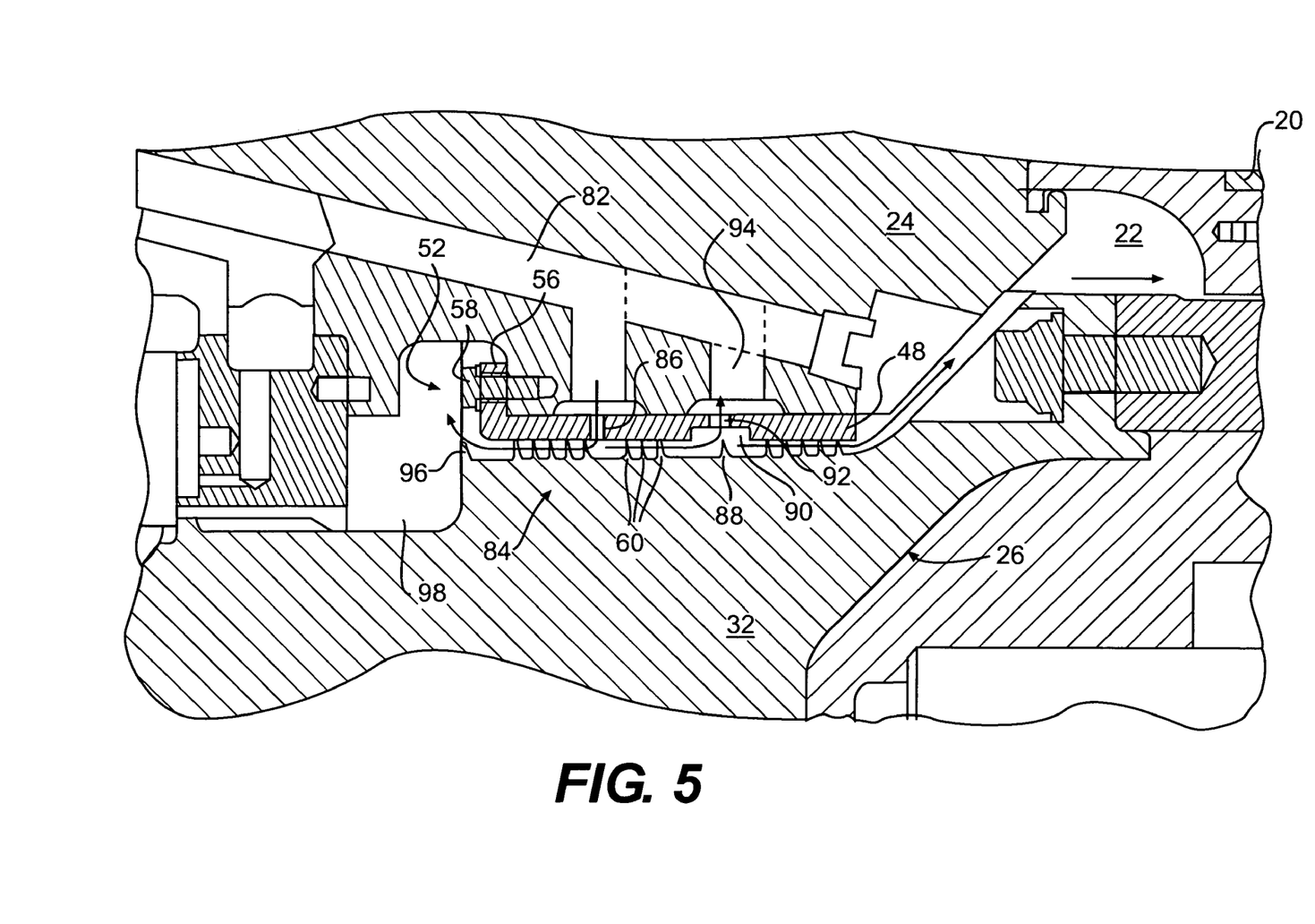
FIG. 5 is a cross-sectional view of a labyrinth seal interface in a turbine engine bearing compartment according to an exemplary disclosed embodiment.

As shown in FIG. 5, air intake housing 24 may include at least one buffer air passage 82, which may direct buffer air to labyrinth seal interface 84, through one or more air inlet holes 86 in seal 48. The influx of buffer air may carry any oil that may have inadvertently leaked into labyrinth seal interface 84 in both forward and aft directions. In the aft direction, an aft oil slinger 88 may direct the buffer air and any oil carried with the buffer air into at least one oil drainage channel 90 incorporated into seal 48, and configured to direct excess oil away from bearing compartment 34. Buffer air and oil directed into oil drainage channel 90 may be vented through one or more vent holes 92 in seal 48 into a vent air passage 94. Additionally, some buffer air may be directed through labyrinth seal interface 84 and vented to compressor compartment 22. In the forward direction, a forward oil slinger 96 may direct the buffer air and any oil carried with it into an oil drain passage 98 in air intake housing 24.

Figure 6A:
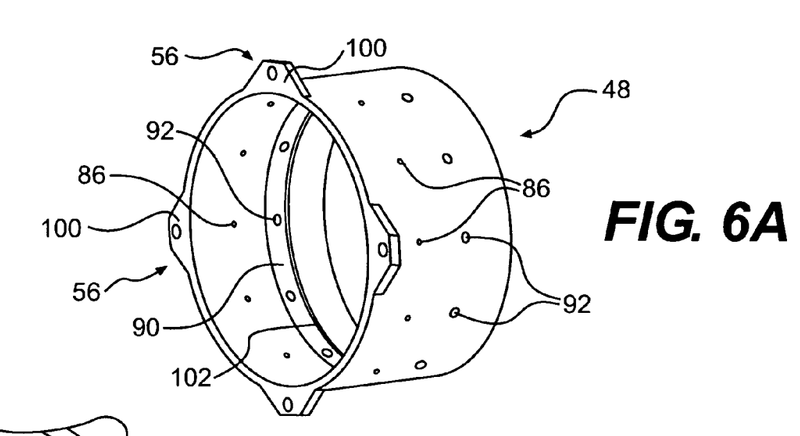
FIG. 6A is a perspective view of an air/oil seal according to an exemplary disclosed embodiment.
Figure 6B:
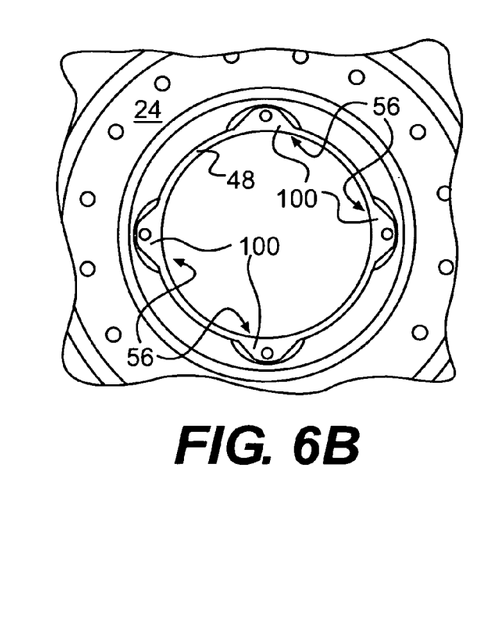
FIG. 6B is a front view of the air/oil seal of FIG. 6A mounted in an air intake housing.
Figure 6C:
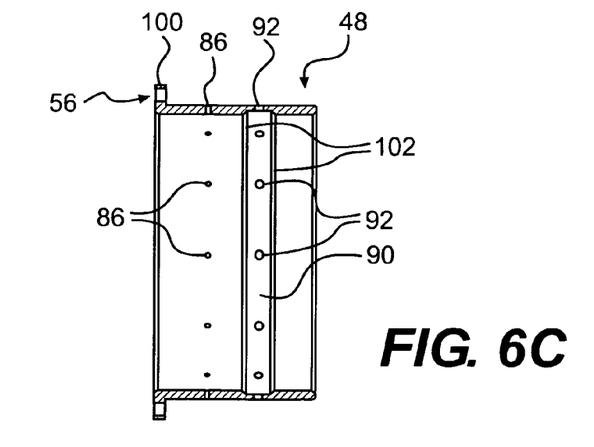
FIG. 6C is a partial cross-sectional view of the air/oil seal of FIG. 6A.

FIGS. 6A-6C illustrate various details of seal 48. For example, in some embodiments, coupling flange 56 may include one or more tabs 100, as shown in FIGS. 6A and 6B. Alternatively, coupling flange 56 may include a single, circumferential flange (not shown) about forward end 52 of seal 48. In addition, as illustrated in FIGS. 6A and 6C, seal 48 may include a circumferential array of air inlet holes 86 and a circumferential array of vent holes 92. Air inlet holes 86 may be equally sized and/or equally spaced about the circumference of seal 48, e.g., at 30 degree angle increments. Vent holes 92 may also be equally sized and/or equally spaced about the circumference of seal 48, e.g., at 30 degree angle increments, as well. Also, in some embodiments, vent holes 92 may have a diameter larger than the diameter of air inlet holes 86.

In addition, as shown in FIGS. 6A and 6C, vent holes 92 may reside within oil drainage channel 90. Oil drainage channel 90 may be a circumferential channel, as shown in FIG. 6A. In some embodiments, oil drainage channel 90 may include angled or chamfered side walls 102, as shown in FIG. 6C.

Industrial Applicability

The disclosed turbine engine embodiments may be suited for any number of industrial applications, such as, but not limited to, various aspects of the oil and natural gas industry. For example, exemplary applications for gas turbines may include transmission, gathering, storage, withdrawal, and lifting of oil and natural gas. In order to facilitate service and/or maintenance, embodiments of the presently disclosed turbine engine may be constructed such that the components most susceptible to wear and failure are positioned in a location ancillary, or substantially external to the engine. In this manner, the components may be removed and subsequently replaced or repaired on-site without extensively disassembling the engine.

The ability to perform service and/or maintenance on-site may have substantial advantages. For example, by performing service and maintenance on-site, both downtime and cost may be substantially reduced. While on-site service and maintenance may provide the greatest benefit for offshore or otherwise remote locations, local job sites may benefit in the same way, albeit to a lesser extent.

In addition to the turbine engine and air/oil seal embodiments discussed above, an associated method for servicing a turbine engine in the field is also disclosed. An exemplary method may include removing components from a portion of an axial drive shaft protruding from a turbine engine, the components including: an accessory drive gearbox, a trim balance flywheel, a bearing assembly, thrust collar and thrust collar nut, an aft bearing assembly, and an air/oil seal. The method may also include substituting at least one new component or reconditioning at least one of the components and reassembling the components in reverse order.

An exemplary method of removing an air/oil seal from a turbine engine, such as engine 10 disclosed above, may include removing one or more components from hub portion 32 of rotor 26 of engine 10. The method may further include removing air/oil seal 48 from opening 50 in air intake housing 24 while air intake housing 24 is mounted to main housing 20 of engine 10. In addition, removing seal 48 from opening 50 may include removing at least one fastener (such as bolts 58) securing at least one flange 56 of seal 48 to air intake housing 24.

In some embodiments, removing one or more components from hub portion 32 of rotor 26 may include removing bearing assembly 35 configured to support both axial and radial loads between rotor 26 and air intake housing 24. In addition, removing one or more components from hub portion 32 of rotor 26 may include removing thrust collar 64 mounted on hub portion 32 of rotor 26 and configured to transfer axial loads to bearing assembly 35. The method may also include supporting hub portion 32 of rotor 26 while removing bearing assembly 35. Further, removing one or more components from hub portion 32 of rotor 26 may include removing flywheel 70, gearbox 72, and/or an accessory device mounted on hub portion 32 of the rotor 26.

Although embodiments of the invention have been described, it will be apparent to those skilled in the art that various modifications and variations can be made in the disclosed seal for a turbine engine without departing from the scope of the disclosure. In addition, other embodiments of the disclosed apparatus and method will be apparent to those skilled in the art from consideration of the specification. It is intended that the specification and examples be considered as exemplary only, with a true scope of the disclosure being indicated by the following claims and their equivalents.

What is claimed is:

1. A seal for a turbine engine, comprising:
   a substantially tubular element configured to be removably mounted without disassembly of an air intake housing in an opening in the air intake housing of the turbine engine;
   a circumferential array of air inlet holes disposed about a circumference of the substantially tubular element of the seal; and
   a circumferential array of vent holes disposed about the circumference of the substantially tubular element of the seal, wherein a total number of vent holes is the same as a total number of air inlet holes;
   wherein the air inlet holes are equally sized and equally spaced about the circumference of the seal; and
   wherein the vent holes are equally sized but larger in diameter than the air inlet holes and are equally spaced about the circumference of the seal.

2. The seal of claim 1, wherein the air inlet holes are spaced apart from one another by 30 degree increments about the substantially tubular element of the seal; and
   wherein the vent holes are spaced apart from one another by 30 degree increments about the substantially tubular element of the seal.

3. The seal of claim 1, further including at least one coupling flange extending radially outwardly from a forward end of the substantially tubular element of the seal, the at least one flange being configured to be secured to the air intake housing with at least one fastener.

4. The seal of claim 1, further including at least one circumferential oil drainage channel about an inner circumference of the substantially tubular element of the seal.

5. The seal of claim 4, wherein the vent holes reside within the circumferential oil drainage channel.

6. The seal of claim 1, wherein the substantially tubular element has an axial length and a diameter; and
   wherein the diameter of the substantially tubular element is substantially consistent over the axial length of the substantially tubular element.

7. The seal of claim 3 wherein the at least one coupling flange includes four coupling flanges spaced 90° apart from each other.

8. The seal of claim 7, wherein the each of the four coupling flanges include a hole configured to pass a fastener therethrough.

9. The seal of claim 3, wherein the air inlet holes are positioned between the vent holes and the at least one coupling flange.

10. The seal of claim 5, wherein the oil drainage channel includes angled side walls.

11. The seal of claim 5, wherein the oil drainage channel includes chamfered side walls.

* * * * *